July 4, 1933.  P. L. TENNEY  1,916,501
TRANSMISSION
Filed Jan. 22, 1931
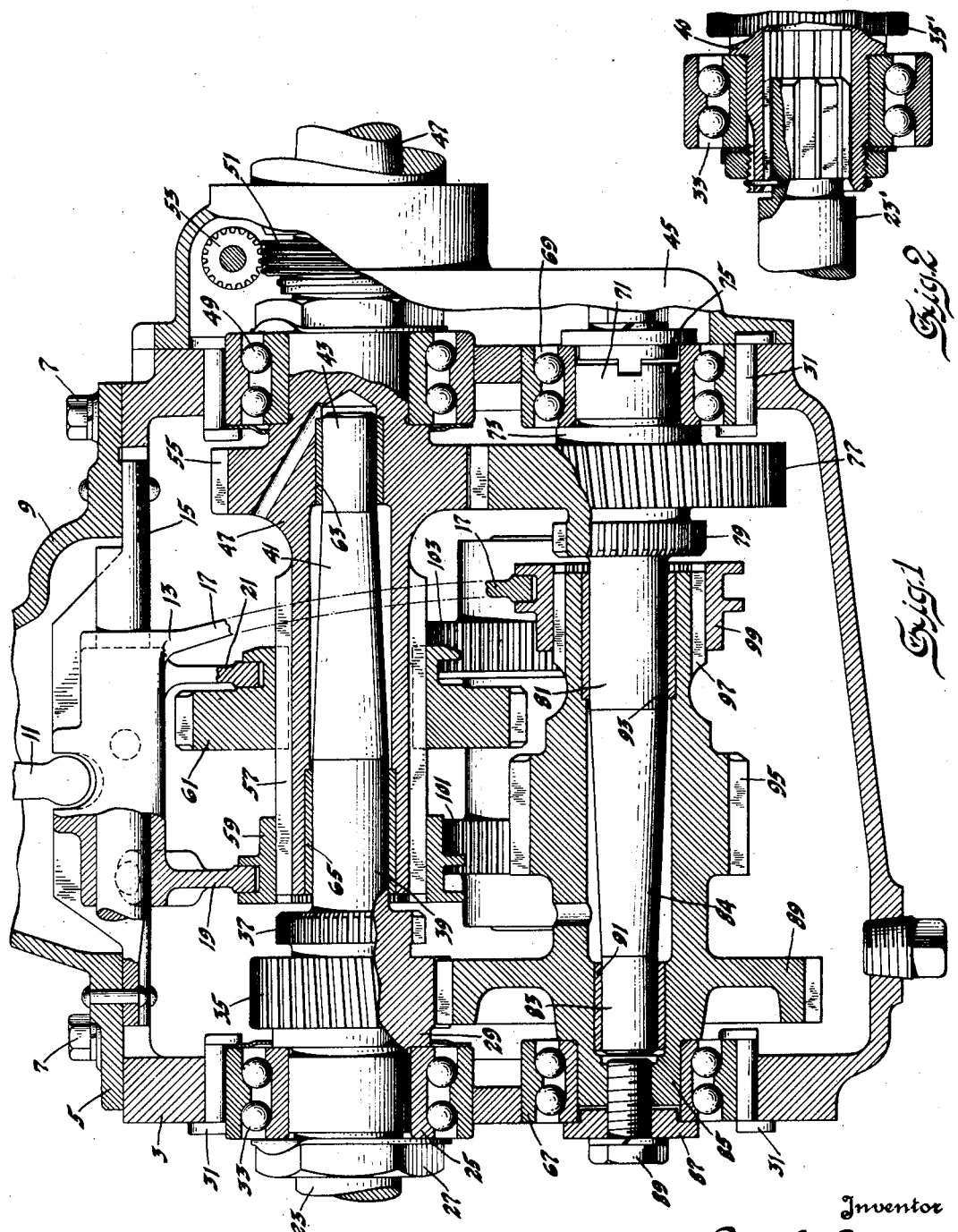

Patented July 4, 1933

1,916,501

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

TRANSMISSION

Application filed January 22, 1931. Serial No. 510,361.

This invention relates to power transmission mechanism and has been designed as an improved transmission for motor vehicles.

An object of the invention is to make such a device very rugged, and to provide a construction in which shaft deflection is avoided.

Other objects and advantages, such as noiselessness and freedom from wear, and convenience in manufacture and assembly are also among the ends to be attained.

The invention described below is illustrated in the accompanying drawing in which Figure 1 is a vertical sectional view.

Fig. 2 is a view in section of a detail from a modified form.

Referring to the drawing, a gear housing 3 has a cover 5 secured thereto by fastening means 7. The cover has a dome 9 within which is the actuating lever 11. The lower end of the lever engages shift members such as 13 slidably mounted on rods 15, the latter secured to the cover. One shift member is provided with two arms 17 and 19, and the other has but one arm 21. These several arms are to engage clutch and gear elements to effect the desired driving ratios as will be further explained.

As 23 is the clutch shaft, the shaft driven by the engine through the instrumentality of the usual clutch. This shaft is rotatably mounted in the front housing wall by a ball bearing 33. The inner bearing race 25 is clamped between a nut 27 on the shaft 23 and a flange 29 also on the shaft and within the housing. The outer bearing race is held by suitable fastening means 31.

Within the housing the shaft 23 is provided with a gear 35 preferably helical in form. This gear is located just within the flange 29, and inwardly of the gear 35 is a clutch member 37. Beyond the clutch 37 the shaft is reduced in dimensions and is formed with a cylindrical part 39, a tapered part 41 and a terminal cylindrical part 43, this latter part 43 being located adjacent the rear wall of the housing.

At the rear end of the housing is secured a closure member 45, and a driven shaft 47 extends through a bearing 49 in the end wall proper of the housing and out through the closure 45. The bearing 49 is positioned in alignment with with bearing 33 for shaft 23, and it is maintained relative to the housing and shaft 47 in substantially the way described in connection with shaft 23. Gearing elements 51 and 53 are housed by the closure 45, these elements being intended to be associated with the drive for a speedometer. Within the gear housing, shaft 47 is provided with a gear 55, this gear being preferably helical, and beyond the gear the shaft is bored out and made tubular. Its outer surface is cylindrical and splined as at 57 for the sliding support of a clutch 59 and a gear 61. The shaft 47 telescopes parts 39, 41 and 43 of shaft 23 and extends to a position closely adjacent clutch 38. Its interior is of three different diameters as shown in the drawing. The smallest diameter portion corresponds to part 43 and roller bearings or bushings 63 are placed between the two shafts in this region. The larger diameter portion is in the region of part 39 and roller bearings or bushings 65 are placed between the shafts at this point. The mid portion of shaft 47 between the bearings 63 and 65 has a diameter such as to be out of contact with part 41. It will be seen from the drawing that arm 19 engages clutch 59 and that arm 21 engages sliding gear 61.

The front and rear walls of the housing also have aligned bearings 67 and 69, the common axis of which bearings is parallel with the axis of bearings 33 and 49. Rotatable in bearing 69 is a shaft 71. This shaft has a flange 73 and securing means 75 on opposite sides of and gripping the inner bearing race. The outer race is held by a locking device corresponding to that already referred to in connection with shaft bearing 33. Within the housing and adjacent flange 73 shaft 71 is provided with a gear 77 helical in form and in constant mesh with gear 55 on shaft 47. Inwardly from gear 77 is a clutch 79. Beyond the clutch the shaft is reduced and has two bearing portions 81 and 83 of unlike diameters and a tapered portion 84 between the parts 81 and 83. The shaft 85 is rotatable within bearing 67, and the inner bearing race is held between a shoulder on the shaft and an outer retainer 87 by fastening means 89. The outer bearing race is held by a part corresponding to part 31. Within the bearing, shaft 85 is provided with a gear 89 helical in form and in constant mesh with gear 35. Beyond gear 89 shaft 85 is bored out to telescope shaft 71. This tubular part of shaft 85 extends to a point adjacent clutch 79. The bore of the shaft is of variable diameter, and bearings 91 and 93 are used just as in the case of shafts 23 and 47. The outside of shaft 85 carries rigid therewith a gear 95 to be engaged by sliding gear 61 when the latter is moved to the left from the position shown in the figure. Adjacent clutch 79 shaft 85 is externally splined as at 97 to slidably carry a clutch 99 designed to engage with clutch 79 when moved to the right from its illustrated position. This clutch is actuated by the arm 17 as shown.

An idler gear element constituted by two united gears 101 and 103 is also shown. The gear element 101 is in constant engagement with the forward part of gear 95, that part which is not used for engagement with gear 61. Gear 61 may be moved from its neutral position shown in the drawing to the right where it may engage gear element 103 for reverse driving.

To drive in low speed the lever 11 is manipulated to shift gear 61 to mesh with gear 95. The drive is then through gear trains 35, 89 and 95, 61. For second speed the lever is shifted to move clutch 99 into mesh with clutch 79. The drive is then through gear trains 35, 89 and 77, 55. For driving at high speed the lever is shifted to effect the disengagement of clutch members 99 and 79 and the engagement of clutch members 59 and 37. As a result of this clutch position, shafts 23 and 47 are rotated as one. For reverse gear 61 is shifted to engage gear 103, the drive then being through gear trains 35—89, 95—101, and 103—61. It will be observed that in shifting to drive at high speed arm 17 is simultaneously moved to slide clutch element 99 still further from clutch 79 than the position it occupies in neutral. This action is effected since both arms 17 and 19 are connected to the same member 13. When driving at high speed, therefore, shafts 85 and 71 are disconnected and each is rotating without load, the rotation of shaft 85 also causing the rotation of the reverse idler. When driving in second speed shafts 85 and 71 are clutched together, and shafts 23 and 47 both under load are independently rotating. The reverse idler is also running free owing to its driving connection with shaft 85. When driving in low speed relative rotary motion takes place between shafts 23 and 47, and also between 85 and 71 but shaft 71 is not under load.

One important advantage of this construction is the way in which the shafts 23 and 47 support each other. Owing to the presence of bearings 63 and 65 there is substantially no possible deflection of these shafts between clutch 37 and gear 55. Gear 35, a part of the gear train 35, 89, is therefore between bearing 33 at its left and a support at its right which is almost the equivalent of a fixed bearing. Shaft 23 at the right of clutch 37 cannot deflect without also deflecting shaft 47 which telescopes it and rotatably supports it. Equally efficient is the support for the driven second speed gear 55. Here the overhang from bearing 49 is negligible and any tendency of the shaft to deflect under load is prevented by the rigidity afforded by the telescopic relation of shafts 23 and 47 as before. No deflection can occur in shaft 47 to the left of gear 55 unless both shafts 23 and 47 are deflected together and obviously any deflection of this kind is negligible. Precisely the same shaft support is present in the case of shafts 85 and 71, so that the two gears of each train 35, 89 and 55, 77 are so supported that shaft deflection with consequent noise and wear is avoided. It will be appreciated also that the helical gears are used to avoid noise when driving in second speed.

Since high speed and second speed are the driving ratios used for by far the greater part of the time, it is believed preferable to locate the clutches and gears operating for these speeds closely adjacent the end wall bearings where the overhang may be reduced to a minimum. Heretofore when second speed has been obtained by gear trains adjacent the end walls of the housing, too frequently the low and reverse drives involving high torque have been located midway between the end bearings and without adequate support to resist the tendency to deflect the shafts and develop wear and noise. By my system of telescopic shafts with plural bearings, the location of the gear trains for low and reverse may be as shown and operate without appreciable shaft deflection. In this case, while the gear trains which operate with high torque are considerably removed from the end bearing supports, any tendency to distortion is avoided by the rigid arrangement whereby neither shaft of the telescopic pair can be deflected without deflection of the other.

It may be added that while no provision for synchronization in shifting into high speed and to second speed has been shown, it is contemplated that some such provision may be found desirable, and the spaces provided in the transmission in the region of clutches 37 and 79 have been made of sufficient size to permit of the introduction of such synchronizing devices if desired. Since this invention is not concerned with any particular kind of synchronizing expedient none is illustrated, the omission making it possible to disclose the invention of this application to better advantage. The structural parts are all strong and rugged. Assembly is simple and easy, and the complete unit is exceedingly compact.

Fig. 2 shows a slight modification. In this figure shaft 23' is the clutch shaft. In the plane of bearing 33 this shaft is splined to a shaft 40. Shaft 40 carries the gear 35' corresponding to gear 35 in Fig. 1. It is also provided with the equivalent of clutch 37 of Fig. 1, and telescopes within shaft 47 as does shaft 23. This arrangement provides flexibility and relieves the gear set and telescopic shafts from any strains resulting from misalignment in mounting the transmission to the motor.

I claim:

1. In a power transmission, a housing, aligned driving and driven shafts, anti-friction bearings for said shafts in opposite housing walls, a gear member fixed on each shaft adjacent its bearing, one of said shafts also having a clutch member adjacent its gear member, said shafts being telescopically arranged between the region of the gear of one shaft and the gear and clutch members of the other shaft, a clutch member slidable and non-rotatable about the outer of the telescopic shafts to cooperate with the first-mentioned clutch member whereby the two shafts may rotate as one, and selective means cooperating with said gears to drive the driven shaft from the driving shaft as a predetermined ratio.

2. The invention defined by claim 1, wherein said last-named means consists of a second pair of coaxial telescopic shafts, the axis of said second pair being parallel with the common axis of the first pair, a gear on each of said shafts of said second pair, each said gear being in mesh with a gear of the first-mentioned telescopic shafts, and cooperating clutch means having one element adjacent the gear of one of the shafts of said second pair and the other cooperating clutch element slidably mounted but non-rotatable about the other telescopic shaft of the second pair.

3. The invention defined by claim 1, wherein said last-named means consists of a second pair of telescopic shafts, the axis of said second pair being parallel with the axis of said first pair, a gear on each of said shafts of said second pair, each said gear being in mesh with a gear of the first-mentioned telescopic shafts, cooperating clutch means having one element adjacent the gear of one of said shafts of said second pair and the other cooperating clutch element being slidable and non-rotatable about the outer telescopic shaft of said second pair, together with selective gearing associated with the outer telescopic shafts of the two pairs.

4. A first pair of coaxial driving and driven telscopic shafts, a second pair of coaxial telescopic shafts, the axes of the two pairs being parallel, means to directly clutch the shafts of the first pair, driving means comprising two pairs of constant mesh gears associated with the shafts of the two pairs and a clutch to lock together the shafts of the second pair whereby one shaft of the first pair may drive the other shaft of the first pair at a predetermined ratio.

5. The invention defined by claim 4, the said driving means including two pairs of constant mesh gears, one gear on each of said four shafts, the gear on the inner shaft of each telescopic pair engaging a gear on the outer shaft of the other telescopic pair.

6. The invention defined by claim 4, the said driving means including two pairs of constant mesh gears, one ear on each of said four shafts, the gear on the inner shaft of each telescopic pair engaging a gear on the outer shaft of the other telescopic pair, together with slidable means to simultaneously move one clutch away from engaging position and the other clutch toward engaging position.

7. In combination, a housing having first and second parallel walls, a driving shaft, an anti-friction bearing for said driving shaft in said first wall, said shaft extending within said casing to a point adjacent said second wall and having rigid therewith a gear and a clutch adjacent said bearing, an aligned driven shaft, a bearing therefor in said second wall, said driven shaft having rigid therewith a gear adjacent the shaft bearing, said driven shaft being tubular in form and telescoping the driving shaft substantially throughout the region between the gear and clutch of the driving shaft and the gear of the driven shaft, a clutch element slidable on the tubular driven shaft to engage the clutch of the driving shaft whereby the driving and driven shafts may rotate as one, a two-part countershaft, the first part rotatably mounted in said first housing wall and having a gear in mesh with the driving shaft gear, the second part rotatably supported in the second housing wall and having a gear and clutch member rigid therewith, the gear being in mesh with the driven shaft gear, the first part being tubular in form and telescoping the second part and extending substantially throughout the region between the gear of the first part and the gear and clutch of the second part, and a clutch element slidable on the tubular first part to cooperate with the clutch element of the second part to lock the two countershaft parts together.

8. The invention defined by claim 7 together with selective gearing between the tubular shafts.

9. In combination, a gear housing having parallel walls, two pairs of telescopic shafts journalled in said walls, the inner shafts of the two pairs being journalled in opposite walls, a gear on each shaft of each pair adjacent an end wall, the two gears adjacent each wall being in constant mesh, a clutch member on the interior shaft of each of said pairs adjacent its gear and also adjacent the end of the outer telescoping shaft, and a slidable clutch member on each outer telescoping shaft to engage the adjacent clutch of the internal shaft.

10. The invention defined by claim 9 together with selective gearing between the outer shafts of said pairs.

11. The invention defined by claim 9 together with shifting means to simultaneously move the slidable clutch members, one toward and the other away from its clutch-engaging position.

In testimony whereof I affix my signature.

PERRY L. TENNEY.